US008090388B1

(12) United States Patent
Opitz

(10) Patent No.: US 8,090,388 B1
(45) Date of Patent: Jan. 3, 2012

(54) METHOD AND APPARATUS FOR DETERMINING A GEOGRAPHIC LOCATION

(75) Inventor: Rodney Paul Opitz, Arlington, TX (US)

(73) Assignee: Uniden America Corporation, Fort Worth, TX (US)

( * ) Notice: Subject to any disclaimer, the term of this patent is extended or adjusted under 35 U.S.C. 154(b) by 889 days.

(21) Appl. No.: 11/725,787

(22) Filed: Mar. 20, 2007

(51) Int. Cl.
*H04W 24/00* (2009.01)
(52) U.S. Cl. .................................. 455/456.5; 455/161.2
(58) Field of Classification Search ....... 455/456.1–457, 455/161.1–178.1
See application file for complete search history.

(56) References Cited

U.S. PATENT DOCUMENTS

| | | | | |
|---|---|---|---|---|
| 5,355,526 A | * | 10/1994 | Berninger | 455/161.2 |
| 5,497,508 A | * | 3/1996 | George | 455/161.2 |
| 5,842,119 A | * | 11/1998 | Emerson et al. | 455/161.3 |
| 6,192,223 B1 | * | 2/2001 | Barnett et al. | 455/164.2 |
| 6,757,544 B2 | * | 6/2004 | Rangarajan et al. | 455/456.1 |
| 6,941,120 B2 | * | 9/2005 | Barnett et al. | 455/164.2 |

\* cited by examiner

*Primary Examiner* — Kent Chang
*Assistant Examiner* — Kashif Siddiqui
(74) *Attorney, Agent, or Firm* — Baker & McKenzie LLP

(57) ABSTRACT

A communication system is disclosed that uses a received wireless signal combined with stored location data about the received signal to determine a location of the communication system or a component of the communication system. The communication system can include a receiver, a processor, and a memory. The processor is adapted to detect identification information in the received wireless signal, search the memory for identification data that matches the detected identification information, and retrieve location data associated with the matching identification information, thereby determining a general location or geographic region in which the receiver is located.

15 Claims, 9 Drawing Sheets

| SYSTEM: | REGION: | CHANNEL: | 1 | 2 | 3 | 4 | 5 | 6 | 7 |
|---|---|---|---|---|---|---|---|---|---|
| 1 | STATE | HIGHWAY PATROL 1<br>HIGHWAY PATROL 2 | ▓ | ▓ | ▓ | ▓ | ▓ | ▓ | ▓ |
| 2 | COUNTY A | COUNTY A SHERIFF | ▓ | ▓ | ▓ | ▓ | ▓ | | |
| 3 | COUNTY B | COUNTY B SHERIFF | | ▓ | ▓ | ▓ | ▓ | ▓ | ▓ |
| 4 | CITY 130 | CITY 130 POLICE<br>CITY 130 FIRE<br>CITY 130 MAINTENANCE | ▓ | | | | | | |
| 5 | CITY 132 | CITY 132 POLICE<br>CITY 132 FIRE<br>CITY 132 MAINTENANCE | | | ▓ | | | | |
| 6 | CITY 194 | CITY 194 POLICE<br>CITY 194 FIRE<br>CITY 194 MAINTENANCE | | | | | | | ▓ |

LOCATION

FIG. 8

METHOD AND APPARATUS FOR DETERMINING A GEOGRAPHIC LOCATION

BACKGROUND

1. Field of the Invention

The present invention relates to systems and methods for determining a location relevant to a radio receiver or a location relevant to a user associated with a radio receiver.

2. Description of Related Art

Wireless telephones, pagers, marine radios, and Citizen's Band (CB) radios are examples of two-way communication systems that typically include a radio receiver and a radio transmitter for wireless communications. Radios, televisions, and radio scanners are examples of one-way communication systems that typically include a radio receiver for receiving wireless communications, but do not typically include a radio transmitter for transmitting wireless communications. For convenience, the term "communication system" is used to refer to systems capable of at least receiving wireless communications, including one-way communication systems and two-way communication systems.

In recent years, a number of service systems have been implemented or proposed which would provide a given service based on the location of a communication system. Such location-based service systems would provide a service in relation to a given location. For example, such a service could locate the nearest ATM, gas station, bank, police station, or restaurant, in relation to the location. The location can be determined using a global positioning satellite (GPS) system.

Another example of a prior location-based service relates specifically to radio scanners. Radio scanners, which are sometimes referred to as "police scanners," typically include a frequency-scanning radio receiver that is programmable to monitor frequencies in a geographical area where the receiver is located. Various methods have been proposed for automating the programming process based on the location of the radio receiver. For example, U.S. Pat. Nos. 6,941,120 and 6,192,223 disclose methods for automatically programming radio scanners based on geographical location information that is received from a global positioning satellite (GPS) system.

While a GPS system can be used for determining the geographical location with accurate results, many communication systems are not capable of receiving and processing GPS data. In some cases, a user is required to purchase a GPS receiver separately in order to take advantage of features that rely on automatic detection of the geographical location of the communication system. Otherwise, manufacturers face increased expense in manufacturing or upgrading a communication system that it can receive and process GPS signals.

It would be desirable, therefore, to provide an improved method for determining a location.

BRIEF DESCRIPTION OF THE DRAWINGS

FIG. 8 shows a table illustrating various groups of channel systems unlocked according to the disposition of a scanner at a variety of locations.

DETAILED DESCRIPTION

While the making and using of various embodiments are discussed in detail below, it should be appreciated that the present disclosure provides many applicable concepts that can be embodied in a wide variety of specific contexts. The specific embodiments discussed herein are merely illustrative, and do not delimit the scope of the claimed invention.

Figure 1:
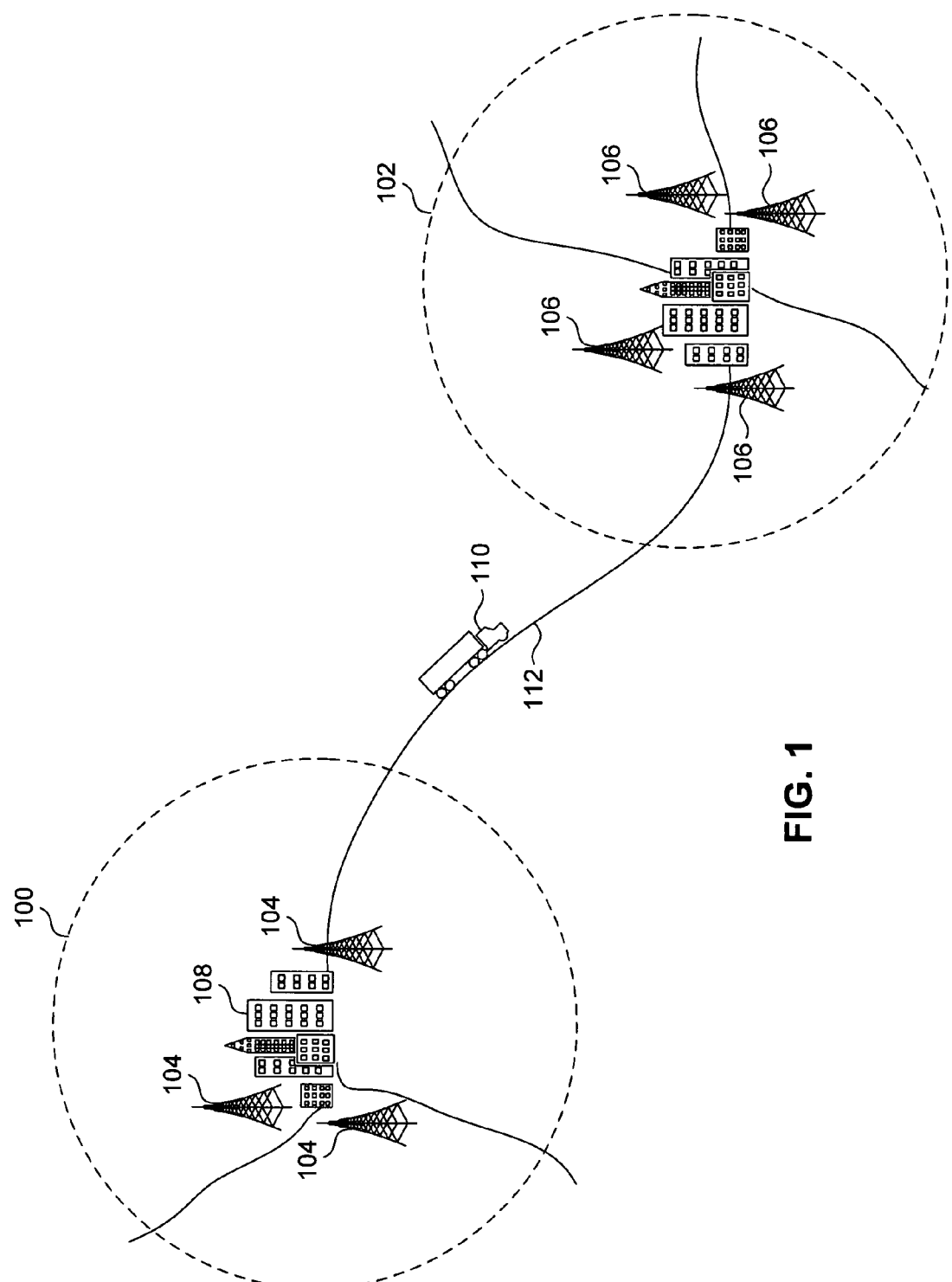
FIGS. 1 and 2 show pictorial representations of geographic regions in which exemplary aspects of the method and apparatus disclosed herein can be implemented.

FIG. 1 shows a first geographic region 100 and a second geographic region 102. Geographic region 100 includes a plurality of radio transmitters 104 and geographic region 102 includes a plurality of radio transmitters 106. Signals from transmitters 104 can generally be received within the region 100. Signals from transmitters 106 can generally be received within the region 102. The transmitters 104 and 106 can include transmitters and repeaters for transmitting commercial radio or television signals, non-commercial radio signals (e.g., police, fire, ambulance, weather, aviation, marine, or amateur radio), cellular telephone signals, pager signals, or other wireless communication signals.

Some of the transmitters 104 and 106 periodically transmit signals that can be interpreted to identify the source of the radio transmission. For example, some radio systems include a control channel on which identification data is periodically transmitted, and the identification data can be interpreted to identify the transmitting radio system. Television and radio signals also commonly include a periodic transmission of a station identifier.

Communication systems as discussed herein can include stationary and mobile systems. For example, a building 108 can have a stationary communication system located therein, while a vehicle 110 can have a mobile communication system.

As the vehicle 110 travels along a highway 112, the set of available communications channels can be expected to change along the route. For example, in close proximity to region 100, local municipal police, fire and rescue channels for city 100 will generally be available to be received. Further, these channels have particular relevance to persons and vehicles located in or near region 100. As the vehicle 110 reaches some distance from region 100, the signal strength of these channels will drop off. Further, the relevance of these channels to vehicle 110 becomes much reduced as vehicle 110 leaves the region 100. Conversely, as the vehicle 110 approaches region 102, the municipal police, fire and rescue channels for region 102 will become available, and will have increased relevance as vehicle 110 approaches region 102.

The communication systems can include a geocoded database that can be stored either onboard or in a separate unit. The database incorporates location data reflecting changes in the availability and relevance of certain channels according to geography. According to the present disclosure, a communication system is operable to update the set of communication channels it monitors or scans as conditions change. When, for example, there is a change in the channels available to be received, or a change in the applicability of the channels to a particular geographic region, the communication system can update the set of channels being monitored or scanned.

Municipal police, fire and rescue communications channels are mentioned herein only by way of example. A communication system according to the present disclosure can be employed to update a wide variety of communication channel types. These communications can include AM and FM broadcast channels, cellular communications channels, television channels, and citizens' band channels, as examples. Further, the regions into which the geocoded database is divided can be defined by a variety of different types of boundaries. These can include, for example, political boundaries, including national borders, state and county lines, and city limits. These and other variations are all within the spirit and scope of the present disclosure.

A communication system as disclosed herein can use identification information included in a received wireless communication signal to determine a current location of the system or of a component or components of the system. For example, a communication system can receive a radio signal that includes identification information, process the identification information to determine that it was transmitted by one of the transmitters 104, determine that the source transmitter 104 is located in geographic region 100, and conclude that its present location is in or near geographic region 100. The location information can then be provided to a user, for example as an audio or video output. The location information can also or alternatively be used for location-based services.

Figure 2:
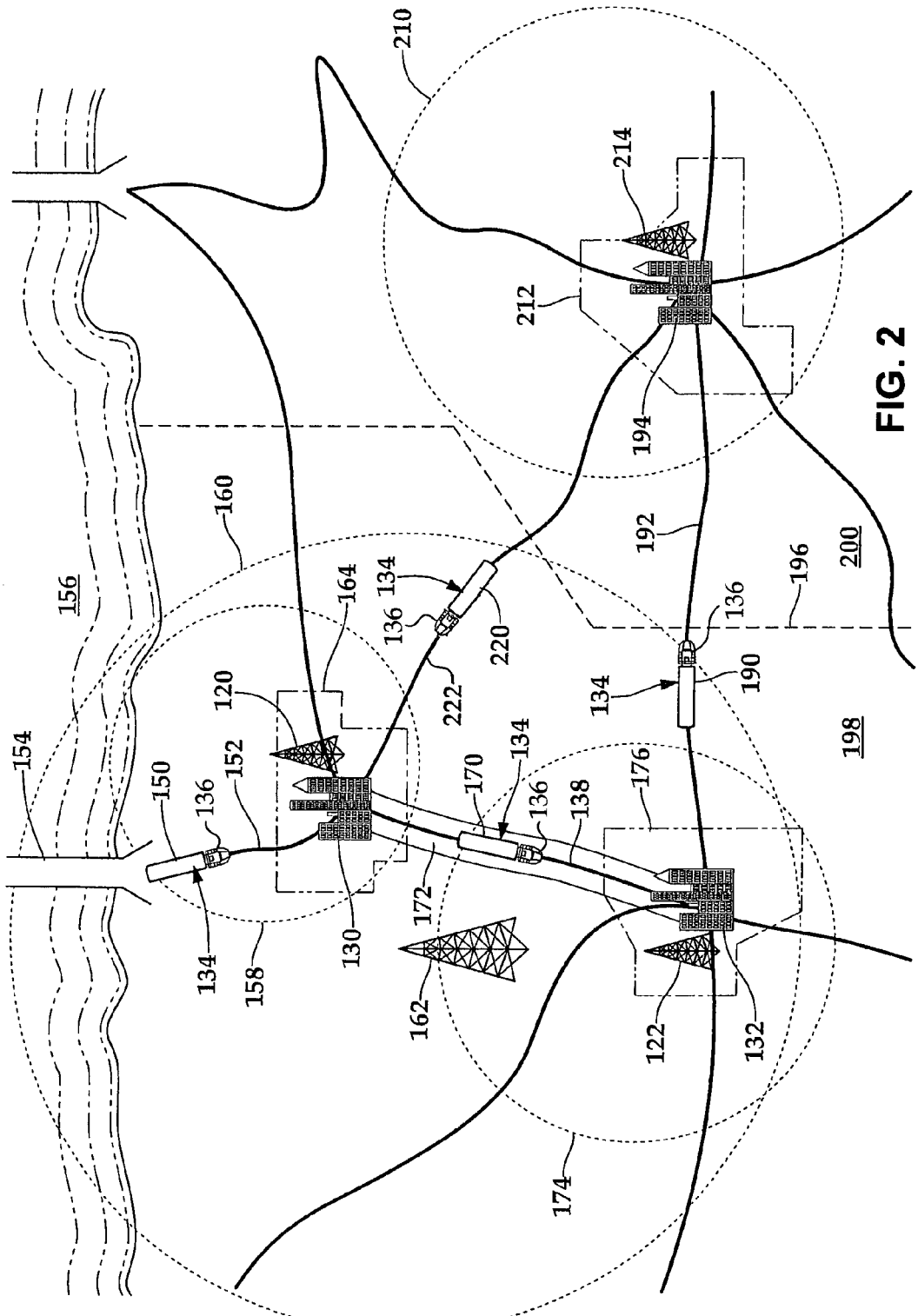

FIG. 2 shows a plan view of a vehicle 134 that includes an onboard communication system embodied as a scanning radio 136 (or simply "scanner" 136), however this disclosure applies equally to other examples of communication systems. The view in FIG. 2 shows the position of the vehicle 134 on a map at successive points in time. The map shown in FIG. 2 includes various types of geographic data. In varying embodiments, the geographic data stored in the scanner 136 can include, but is not limited to, data relating to the layout of major highways and waterways, the general location of major cities and airports, national and state political boundaries, the layout of local streets and tributaries, the location of local points of interest, and county and city political boundaries, as examples. Whatever the scope of the geographic data includes, the data is stored within a database located either within the scanner 136 or within an external module, as described in further detail below.

The path of travel of the vehicle 134 across the map of FIG. 2 is illustrative of various types of channel set changes that can be triggered within the scanner 136 at various points in time. As the vehicle 134 approaches certain geographic regions, the onboard scanner 136 begins receiving signals from sources of wireless transmissions within those regions, and so certain groups, or "systems" of channels, which serve as examples of sources of wireless signals, may be unlocked, and thereby included in the set of channel systems to be scanned by the scanner 136. These will generally include systems of channels having relevance to those geographic regions. Similarly, as the vehicle 134 leaves certain regions, the onboard scanner 136 ceases to receive signals from systems within those regions, and so systems of channels may be locked, and thereby not included in the set of channel systems scanned, as described in detail below.

Initially, the vehicle 134 enters the map in the vicinity of location 150 on highway 152 after crossing bridge 154 over waterway 156. At location 150, the vehicle 134 is within a defined communication region 158 defining the useful geographic reach of signals from communication tower 120. The vehicle 134 is also within communication region 160, representing the useful geographic reach of signals from communication tower 162.

In certain embodiments, the status of certain systems can be updated according to the availability of communications from communications towers 120 and 162 as vehicle 134 crosses into communication regions 158 and 160. In certain embodiments, a particular channel system can be unlocked only when scanner 136 is within useful range of a transmitting tower and the scanner 136 is within or near a political area within which that channel system has relevance. The status of certain systems to be updated once the scanner 136 receives a signal from tower 120 or 162 can be limited to systems within a predefined or selected region, for example systems that are within the city limits 164 of city 130, or relevant to city 130.

Within the city 130, vehicle 134 exits highway 152, enters highway 138, leaves city 130 and heads toward city 132 along highway 138 as shown in FIG. 2. As the vehicle 134 leaves city 130 along highway 138, it exits communication region 158 of communication tower 120. This event can cause status changes to one or more systems. The vehicle 134 remains within communication region 160 of tower 162. Vehicle 134 is shown at position 170, a point approximately halfway between city 130 and city 132. At position 170, the vehicle 134 has entered communication region 174, representing the useful communication area for communication tower 122. Entry into this region can generate changes to the status of one or more channel systems associated with communication tower 122. Located at position 170, the vehicle 134 continues past city limits 176 of city 132 and into the center of city 132, where it exits highway 138 and enters highway 192, which leads from city 132 to city 194. After entering highway 192, vehicle 134 travels away from the center of city 132 on highway 192, over to position 190. Along the way, vehicle 134 exits communication region 174. As above, this event can trigger an update to the status of one or more channel systems associated with any one of these geographic regions.

At position 190 on highway 192, the vehicle 134 is outside of communication region 174 and approaching the edge of communication region 160. Vehicle 134 is also approaching county line 196 separating county 198 from county 200. Depending on the embodiment and the particular device settings, the exit from communication region 160 can cause an update of channel system status within scanner 136 of systems associated with the county 198, the city 132, the regions 160, the region 174, or any combination of these.

After traveling past position 190, the vehicle 134 travels into communication region 210 of communication tower 214 and past city limits 212 of city 194. The vehicle 134 exits highway 192, enters highway 222 to city 130, and then travels along highway 222 to city 130. Along the way, vehicle 134 exits city limits 212, exits communication region 210, crosses county line 196 back into county 198 and reenters communication region 160. As above, entry and exit of the communication regions 210 and 160 can initiate an update to the status of channel systems stored within scanner 136.

Figure 3:
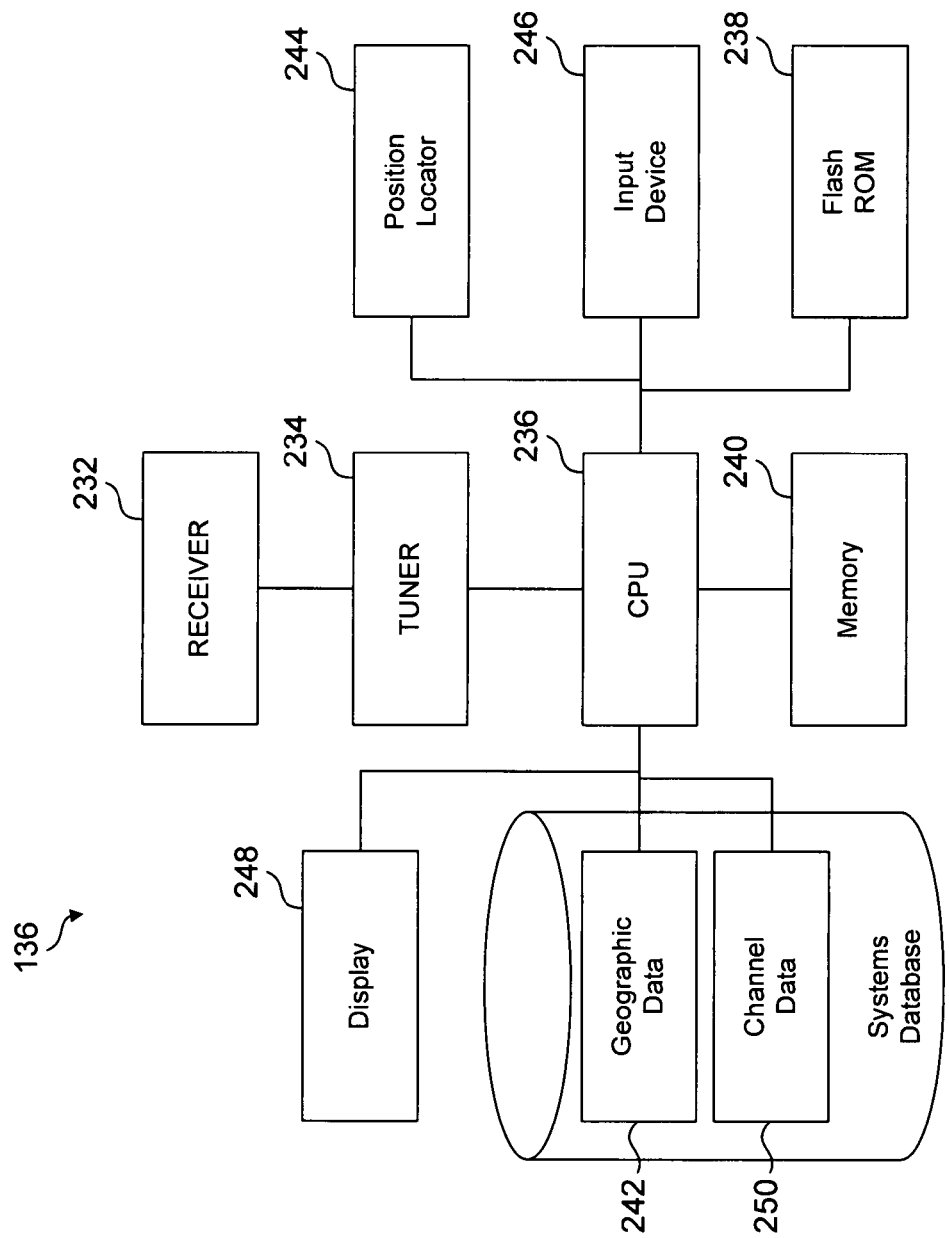
FIG. 3 shows a block diagram of a communication system in which exemplary aspects of the method and apparatus disclosed herein can be implemented.

FIG. 3 shows a block diagram of the scanner 136, which serves as an example of a communication system. While the scanner 136 is used as an example of a communication system, the concepts disclosed herein can used in other devices such as AM/FM radios, televisions, or any other wireless signal receiving device in order to detect a location. A communication system such as the scanner 136 comprises a receiver 232 capable of receiving wireless communications. The scanner 136 is capable of determining its geographic location, or at least the location of the receiver 232 in embodiments where components of the scanner 136 are remotely dispersed, based on a received wireless communication.

The scanner 136 includes a display 248 that displays identification data corresponding to the channel being monitored by the scanner 136. The identification data can include information such as the frequency of the transmission, the name of the transmitting party, and the usage type of the transmission. The display 248 can be any suitable type of display including, but not limited to, a liquid crystal display or a light emitting diode display. In certain embodiments, the display 248 can be used by the scanner 136 to graphically present available channels to the user for review. In certain embodiments, the user can expressly select from the available channels those channels he or she wishes to scan. Only those channels selected for scanning are then included in the scan list. The scanner 136 can also be programmed to presumptively scan available channels, and the display 248 can be used to select channels which are to be excluded from the scanning list.

The scanner 136 includes a data input device 246, which can include, for example, a numerical key pad. It should be noted that data input device 246 can additionally be used to perform functions other than simple numeric data input such as alphanumeric data input, selection of channel banks and systems, selection of priority channels and the like. The scanner 136 can include a plurality of function input members which are used to instruct scanner 136 to perform numerous functions such as scan, search, and hold. The scanner 136 can include a program control that can be used by a listener to prompt the scanner 136 to program itself. In addition, a program control can be use to place the scanner 136 in a programming mode as will be discussed in greater detail below in connection with FIG. 6. Inputs can also include controls to turn scanner 136 on and off, adjust the volume of scanner 136, adjust the squelch of scanner 136 and the like.

The scanner 136 includes a receiver 232 that is coupled to an antenna (not shown) for receiving radio transmissions from the various transmitting parties. A tuner 234 is coupled to the receiver 232. The tuner 234 can be used to search the entire range of radio frequencies that can be monitored by the scanner 136, but is preferably used to scan the specific radio frequencies programmed into the scanner 136.

A central processing unit (CPU) 236, such as a microprocessor, is coupled to the tuner 234 and is used to control the frequencies that are monitored by scanner 136. In the illustrated embodiment, the CPU 236 executes a program stored in a memory 238, which is preferably a static memory such as a flash ROM. The program instructs the CPU 236 to search for frequency data stored in a memory 240, which is also preferably a static memory, to determine whether the tuner 234 should stop scanning when a transmission is detected at a particular frequency by the receiver 232. Specifically, if the frequency of the detected transmission corresponds to a channel which has been unlocked and/or enabled, then the CPU 236 will instruct the tuner 234 to stop scanning when a signal is detected on that frequency by the receiver 232. If, on the other hand, the frequency of the detected signal does not correspond to a channel which has been unlocked and/or enabled, then the CPU 236 will instruct the tuner 234 to continue scanning.

The scanner 136 incorporates geographic data 242, which can include any of the geographic data described above. The geographic data 242 is intended to represent the collection of geographic data stored within the scanner 136. In operation, the location of the scanner 136 can be determined by a position locator 244. The position locator 244 uses the receiver 232 to receive wireless signals from sources of wireless transmissions, for example communication towers 120, 122, 162, or 214. When receiving the signals, the position of scanner 136 can be determined based upon a signal identification process that includes detecting identification information contained in the received signal, searching the channel data 250 for identification data that matches the identification information in the received signal, and retrieving location data associated with the matching identification data. An example of this process is discussed below in greater detail in connection with FIG. 5. The CPU 236 is used to process the location data such that the position of the scanner 136 can be used in identifying transmitting parties of interest.

In some embodiments, the position locator 244 can use a combination of methods and/or devices to determine the location of the scanner 136, or at least the receiver 232. For example, in some embodiments the position locator 244 can use a GPS system in addition to, or in concert with, the signal identification process described above and further described below in FIG. 5. In some such embodiments, the scanner 136 can provide the user the option of selecting a method for determining the location and/or can use one method as a backup for the other. For example, the scanner 136 can be configured such that in the event that a GPS signal cannot be received, the signal identification method described above and further below in FIG. 5 is used.

Once the location of the scanner 136 has been determined, the location is plotted against geographic data 242 in order to determine the geographic region or regions within which the scanner 136 is presently located. The geographic data 242 will not, in some cases, be stored in a discrete and separate collection or database, but will be intermingled with other data within a larger database. In some embodiments, the geographic data 242 can, however, be contained within a single internal database or can even comprise a plurality of internal databases. The geographic data 242 can be stored on one or more removable memory devices such as a removable memory card, a compact disc (CD), a digital versatile disk (DVD), a removable hard drive or the like. At least some of the geographic regions defined within geographic data 242 are associated with channel systems. The identity of one or more current geographic regions is used to identify which, if any, channel systems included in channel data 250 can be unlocked and monitored by scanner 136 at the present location.

The scanner 136 will periodically scan the channels associated with each of the unlocked and/or enabled channel systems to monitor signals on those channels. The channel systems can be organized based upon usage type or other listener preference. Information about the transmitting parties being monitored can be presented to the listener of scanner 136 via the display 248 or other suitable format.

The channel data 250 can include information such as the frequency allocation of various communication channels. As with the geographic data 242, the channel data 250 can be stored within a single internal database or within a plurality of internal databases. Alternatively, the channel data 250 can be stored within one or more removable memory devices such as a removable memory card, a compact disc (CD), a digital versatile disc (DVD), a removable hard drive or the like. In either case, channel data 250 can include frequency data relating to substantially all of the frequency allocations in a large geographical region, such as a state, a region of a country, an entire county or continent and the like. Channel data 250 will generally include frequency data for a region significantly larger than the geographical area from which scanner 136 can monitor transmissions at any one time or at from any one location.

Alternatively, channel data 250 can include only a subset of the channels within a large geographical region. For example, an internal portion of channel data 250 can contain channels having particular usage types such as police frequencies, airport frequencies, emergency medical service frequencies, fire department frequencies, public service agency frequencies, local business frequencies or combinations thereof. In addition, a removable memory portion of channel data 250 can be used to add frequencies of addition usage types such as NASCAR frequencies, mariner frequencies, ham frequencies and the like.

As frequency allocations and transmitting parties periodically change, channel data 250 can be periodically updated. In the case where channel data 250 is stored on removable memory devices, new removable memory devices containing updated frequency data can be obtained. Alternatively, updated frequency data can be downloaded from various locations, such as via the Internet, and stored in channel data 250 regardless of whether channel data 250 is internal, removable or both. It is not necessary to provide the geographical location of scanner 136 when updating channel data 250 as the frequency data being downloaded is for a geographical area much larger than the area from which transmissions can be monitored by the scanner 136 at any one time or from any one location.

The scanner 136 is not limited to operations with conventional frequency allocation schemes. In some embodiments, the scanner 136 is operable to work with alternate frequency allocation schemes, including but not limited to "trunking" radio systems. In conventional municipal radio systems, particular frequencies were assigned to particular types of traffic. For example, a first discrete frequency in a city radio communication system can be assigned to police transmissions while a second discrete frequency can be assigned to fire and rescue transmissions. Yet another discrete frequency might be assigned to city repair crews. This scheme has been determined to be inefficient, owing to the large number of channels which are idle most of the time.

In order to remedy the above situation, frequency allocation schemes known as "trunking" schemes have been developed. Examples of known types of trunking systems include Motorola trunking systems (including Motorola Type I, Motorola Type II, Motorola Type IIi Hybrid, and Motorola Astro Digital), Logic Trunked Radio (LTR), Enhanced Digital Access Communication System (EDACS), and Association of Public-Safety Communications Officials Project 25 (APCO P25). In municipal emergency radio systems, trunking schemes can be employed to remove bottlenecks in the radio communication, due to inefficient use of radio frequency (RF) channels. Trunking is an automatic sharing of a pool of frequencies among users. A central control unit assigns channels to the users on demand, for the duration of the call. This method reduces the likelihood of having unused channels in the system. In certain configurations, four radio channels incorporated into a trunked system can handle up to seven times more calls than a conventional system having four channels.

In a trunking system, the channel assigned to carry the unit-to-unit traffic is referred to as a "working channel." Prior to the actual unit-to-unit traffic, data transmissions between a user radio and a central trunking controller must be conducted in order to direct the user radio to the proper channel for communication. A radio channel used for this coordination is known as a "control channel." A control channel acts as a conduit for the commands and requests being sent back and forth between the units in the field and the central controller. A control channel receiver listens for requests from field units. A control channel transmitter sends channel assignments out to the units on the system. The control channel also periodically broadcasts system identification information such as an identification name or code that is unique to that system.

When idle, the radios in the field generally stay tuned to the control channel transmitter frequency waiting for instructions that can apply to them. If a valid unit in the field transmits (keys up), the processor should recognize the unit and choose an available working channel for it, as well as for the unit or units being called. The trunking controller will route these units to the assigned working channel, and communications through the system can begin. When the calling party unkeys, the working channel can be immediately released. Subsequently, all units revert back to the control channel.

Normally, when a channel has been assigned and communications has begun, the initiating party has control of the channel. When an assigned channel is released by one user radio, it becomes available to another user radio. Even if the same unit transmits again immediately after releasing a channel, the assignment process will repeat, starting "from scratch." The same group of users over a period of several transmissions can be assigned a different channel in the system each time. This is referred to as "transmission trunking." In certain trunking systems, a delay or hang time can be initiated after a user unkeys. The channel assignment can be maintained as long as users in the group continue to use the channel before the delay or hang time expires. This is referred to as "message trunking."

Figure 4:
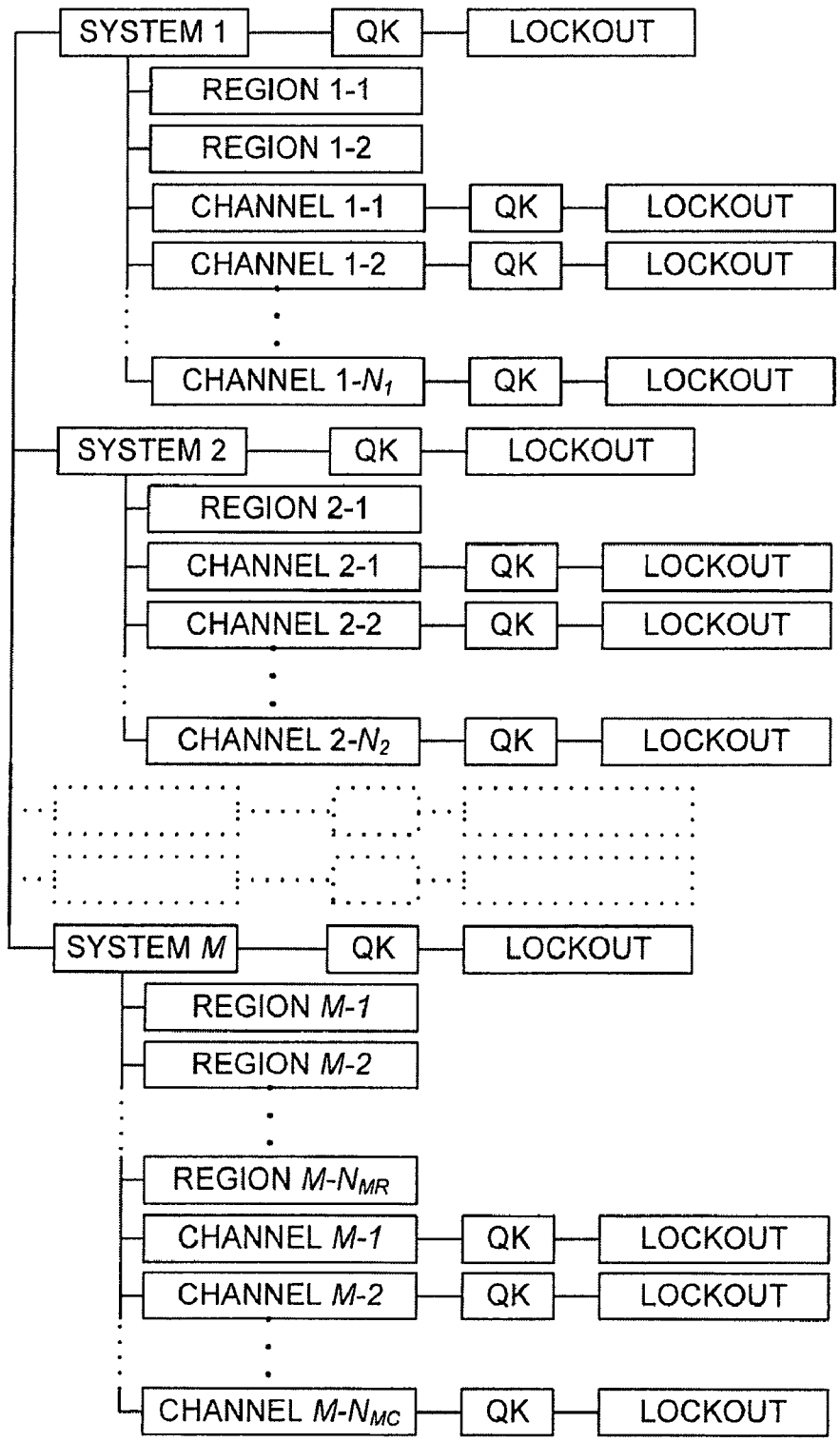
FIG. 4 shows an embodiment of a system data storage structure useful within the context of the present disclosure.

FIG. 4 shows an embodiment of a system data storage structure useful within the context of the present disclosure. As shown in FIG. 4, the channel and region data for each system is arranged in a tree structure within a record for that system. FIG. 4 shows system data for a group of systems numbered 1 through M, where M is an arbitrary integer representing the number of systems in the database.

Each system record includes system level data and channel data, and can include geographic data. System level data can include, but is not limited to, QuickKey (QK) status and locked/unlocked status. Channel data includes data related to each of the channels associated with the system. This will generally include frequency information for each channel in the system, and can also include QuickKey (QK) status and locked/unlocked status for each channel. Certain system records will incorporate geographic data as appropriate. The system record for SYSTEM 1, for example, includes data relating to REGION 1-1 and REGION 1-2. The system record for SYSTEM 2 includes data relating to only a single region, namely REGION 2-1. Although each of the systems in FIG. 4 is shown having at least one geographic region associated with it, certain systems can have no geographic data associated with them, in which case those systems are assumed to not be geographically-limited.

Figure 5:
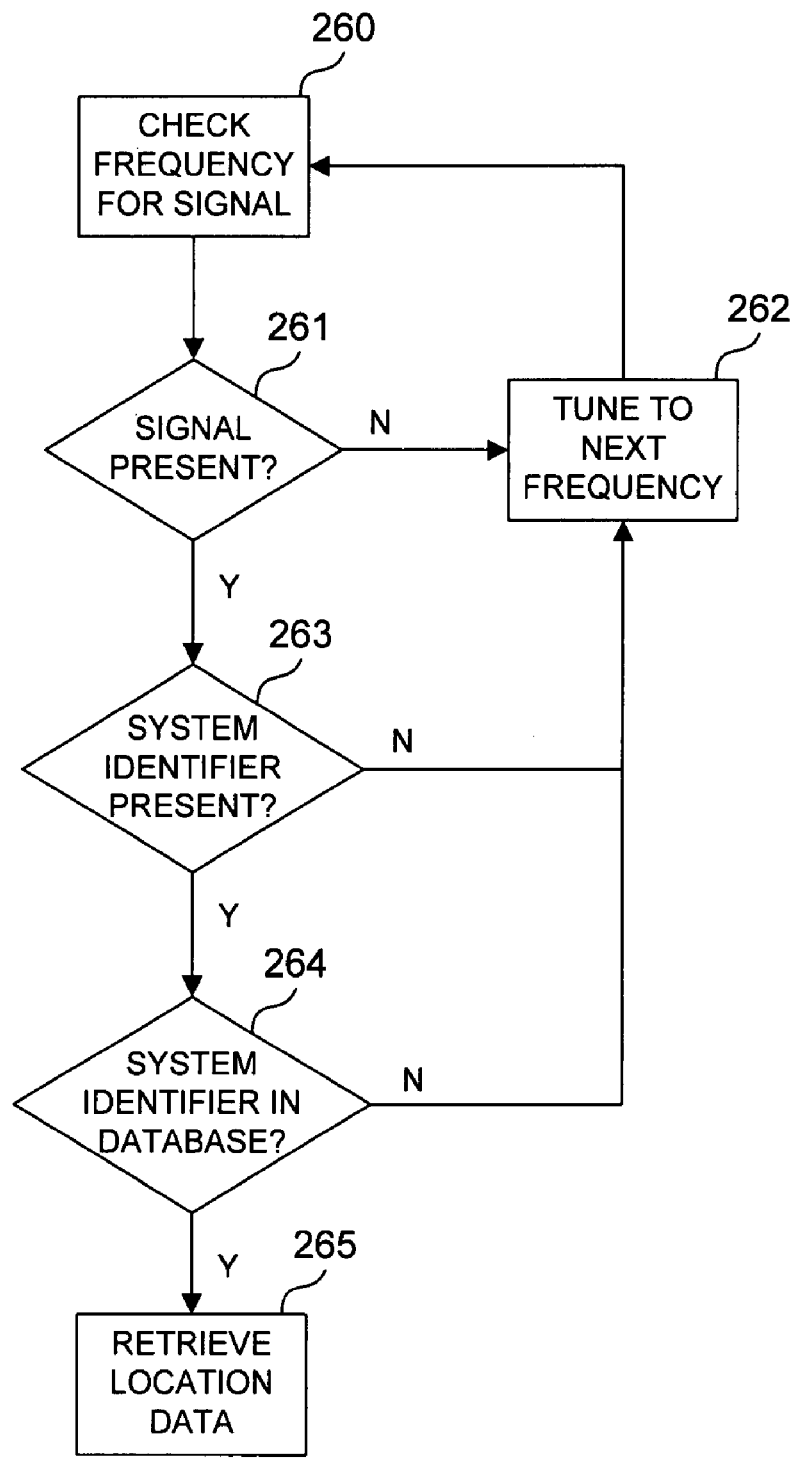
FIG. 5 shows a flowchart that illustrates a method of determining a general location.

FIG. 5 shows a flowchart that illustrates a method of determining a general location, for example using the scanner 136. At Block 260, the scanner 136 checks a certain frequency for the presence of a signal. At block 261, if no signal is detected then the process continues to block 262 where the scanner 136 is tuned to another frequency that is checked at block 260 for a signal. This loop that includes blocks 260-262 continues until a frequency is found that includes a signal, unless the process is otherwise terminated. Once a frequency having a signal is detected, the process continues to block 263, where the frequency is monitored for the presence of a system identifier. In some embodiments, the block 263 can include detecting identification information in the signal in the form of system identifier data that is broadcast as part of a digital data stream. For example, the block 263 can include detecting a system identifier on a control channel for a trunking radio system.

In some embodiments, block 263 can include audio analysis, which can include Morse code and/or speech analysis, to detect station identification, such as a call sign or other unique designation for a transmitting station. Call signs can include the unique designators that are assigned in the United States by the Federal Communications Commission (FCC) and similar such designators assigned in other countries. Station identification is a practice mandated by the FCC for all broadcast television stations and radio stations in the United States. According to FCC regulations, broadcast stations must identify themselves as near to each full hour as possible. Though the FCC does not designate exact times, many stations typically identify themselves at some point during the period of five minutes before the hour up to the hour. The FCC allows the time to vary so stations can have some flexibility in scheduling around their various live and taped programming and commercials. Both radio and television stations are also required to identify themselves at the beginning and end of each broadcast period. For example, if a station goes off the air at 11 PM, it must identify itself then and again when it resumes broadcasting. Thus, the process at block 263 can in some embodiments be performed during time frames when station identification is most likely to be broadcast.

If no identification information is detected at block 263, then the process returns to block 262 and continues as described above. Otherwise, if identification information is detected, the process continues to block 264. At block 264, a memory, for example a database storing the channel data 250, is searched for identification data that matches the identification information in the received signal. If no matching identification data is found, then the process returns to block 262 and continues as described above. Otherwise, the process continues to block 265 where location data associated with the matching identification data is retrieved from the memory. This retrieved location data provides the scanner 136 with an indication that the scanner 136, or at least the receiver 232, is located within receiving range of the location associated with the retrieve location data. Note that, at block 264, if there is no location data associated with the matching identification data, then the process returns to block 262 and continues as described above. Also note that the process shown in FIG. 5 can be used to determine a change in location by adding a step after block 265 that includes comparing the detected location from block 265 to a previously stored location of the scanner 136, or at least the receiver 232.

Figure 6:
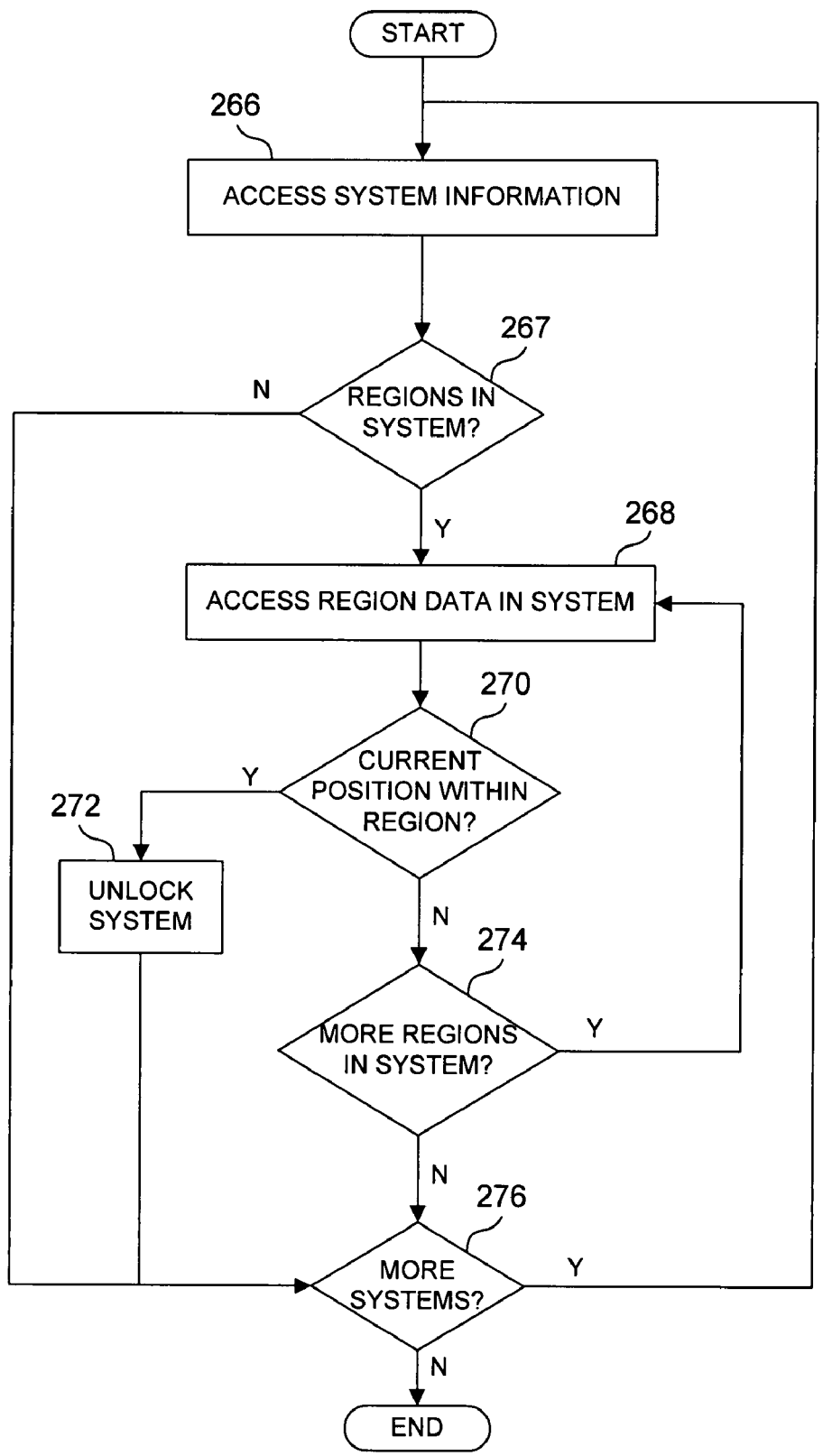
FIG. 6 shows a flowchart that illustrates a method of using the location information obtained during the process shown in FIG. 5 to program a communication system.

FIG. 6 shows a flowchart that illustrates a method of using the location information obtained during the process shown in FIG. 5 to program the scanner 136. This process can be initiated, for example, in response to user input and/or in response to a detected change in location. At Block 266, information relating to a source of wireless signals, for example information relating a "system" stored as channel data 250, is accessed. Decision block 267 determines whether the system record includes geographic region data. If the record does include region data, process flow proceeds to block 268. If the record does not include system data, process flow jumps down to decision block 276.

In block 268, the scanner 136 accesses data relating to a region within the system. In decision block 270, the scanner 136 determines whether the current position of the scanner 136 lies within the region for which data was accessed in block 268. If the current position does lie within the region, process flow proceeds to block 272, where the current system is unlocked, and then to decision block 276. If the current position does not lie within the region, process flow proceeds to block 274.

Process flow from decision block 274 depends on whether there are more regions in the system record currently being accessed. If there are more regions in the system, process flow returns to block 268, where the data relating to another region in the system is accessed. If there are no more regions in the current system, process flow proceeds to block 276. Process flow from block 276 depends on whether there are more systems in the system database. If there are more systems, process flow returns to block 266, where data relating to another system is accessed. If there are no more systems in the database, the process ends.

Figure 7:
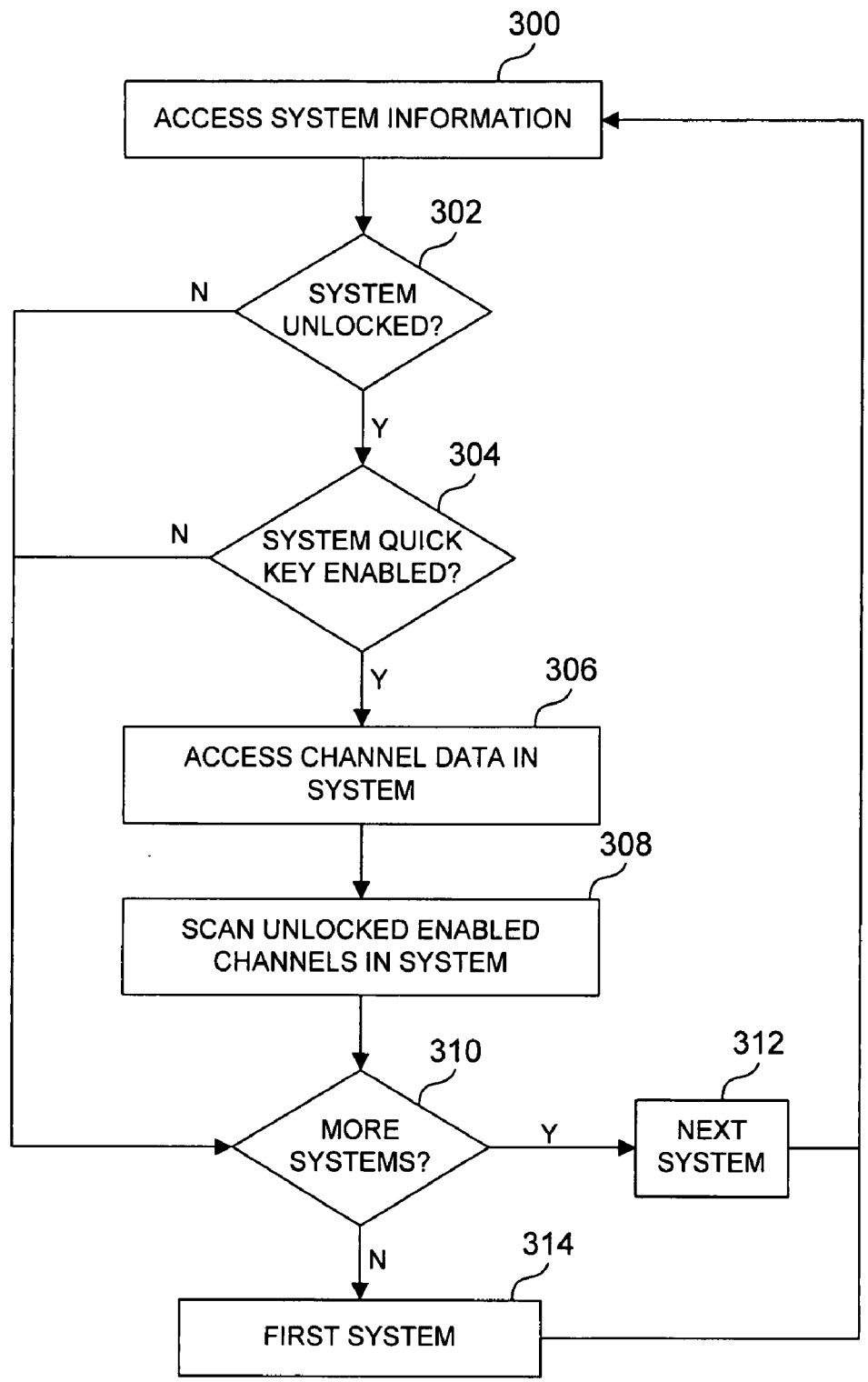
FIG. 7 shows a flowchart illustrating a method of scanning unlocked channels.

FIG. 7 shows a flowchart illustrating a method of scanning unlocked channels. In block 300, the scanner 136 accesses data relating to a system within the system database. In decision block 302, the scanner 136 determines whether the accessed system is unlocked. If the system is unlocked, process flow proceeds to block 304. If the system is not unlocked, process flow proceeds directly to block 310. In block 304, scanner 136 determines whether the accessed system is Quick Key enabled. If the system is enabled, process flow proceeds to block 306. If the system is not enabled, process flow proceeds directly to block 310. In block 306, the scanner 136 accesses the channel data stored in the currently accessed system. In block 308, the scanner scans the unlocked enabled channels in the currently accessed system and process flow proceeds to decision block 310.

Process flow from block 310 depends on whether there are more system records stored in the systems database. If there are more systems, process flow proceeds to block 312, where another system is identified, and then back to block 300. If there are no more systems, process flow proceeds to block 314, where the initial system is identified, and then back to block 300.

FIG. 8 is a table showing certain combinations of channels which can be unlocked by the scanner 136 based on certain locations of the scanner 136. As shown in FIG. 8, the data is organized into channel systems arranged vertically along the left column. Each of the systems has a set of one or more communications channels that have been associated, by the user or otherwise, with that system. For example, the system numbered 1 is associated with a region titled STATE and is associated with the channels HIGHWAY PATROL 1 and HIGHWAY PATROL 2. Although each of the systems in FIG. 8 is depicted as being associated with only a single unique region, a single system may be associated with two or more regions, as described above. Similarly, a given region may be associated with two or more distinct systems.

A set of locations are listed horizontally along the top of the table. Beneath each of the location headings is a column indicating which systems will be unlocked by scanner 136 based upon the determination of the region or regions within which a given location sits. In general, FIG. 8 reflects the system lock/unlock changes which would be effectuated by scanner 136 as vehicle 134 travels along the sequence depicted in FIG. 2. System 1, associated with the STATE region, is continuously relevant along the path of travel depicted in FIG. 2. At least one of channel systems 2 and 3, each of which is associated with at least one county, will be relevant at any given time along the path. Systems 4, 5, 6 associated with individual cities will generally only be relevant when vehicle 134 is in the vicinity of one of these particular cities. For example, at LOCATION 1, which is a location at or near city 130, systems 1, 2 and 4, associated with systems STATE, COUNTY A and CITY 130 respectively, are available and have been unlocked for scanning. At LOCATION 2 and LOCATION 4, which lie on either side of city 132, only systems 1 and 2 associated with regions STATE and COUNTY A are unlocked. At LOCATION 3, systems 1, 2 and 5, associated with the STATE, COUNTY A and CITY 132 regions, are unlocked. At LOCATION 5, which lies near the county line between COUNTY A and COUNTY B, systems associated with regions STATE, COUNTY A and COUNTY B are unlocked. At LOCATION 6, systems associated with the STATE and COUNTY B regions are unlocked. At LOCATION 7, which lies in the vicinity of city 194, the systems associated with regions STATE, COUNTY B and CITY 194 are unlocked.

Figure 9:
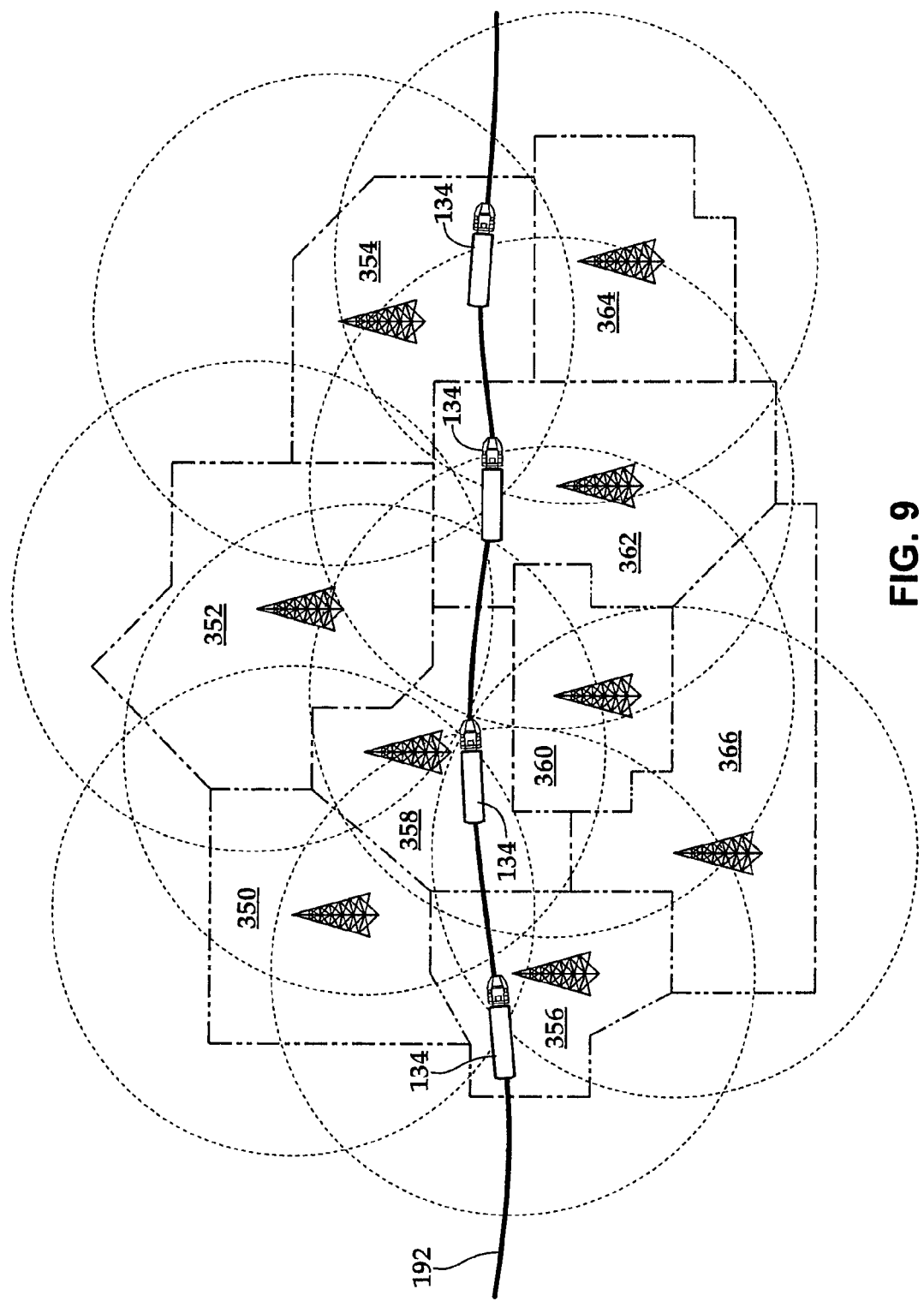
FIG. 9 shows a top view of a geographic area having multiple geographic regions defined by political boundaries.

FIG. 9 shows a top view of a geographic map of a set of geographic regions 350-366 lying along highway 192. The type of geographic regions depicted are not critical to the present invention, but geographic regions 350-366 can, for example, be political regions, such as cities, counties or states. In contrast to the situation described above in connection with FIG. 2, geographic regions 350-366 do not overlap one another, but are defined at their edges by shared boundaries.

It can be seen in FIG. 9 that each of geographic regions 350-366 has a communication tower disposed therein. For the purposes of the foregoing discussion, it is to be understood that each communication tower transmits channels specific to the geographic region within which it is disposed. In certain situations, multiple communication towers will be disposed within a single geographic region. In certain situations, multiple regions can share a single tower.

As vehicle 134 travels along highway 192, it will pass through a number of geographic regions and come within the useful range of a number of communication towers. At certain points along highway 192, vehicle 134 will have access to a substantial collection of communication channels, only certain of which can be of interest to a given user.

In certain situations, the user may only be interested in those channels being used by the local authorities of the geographic region within which vehicle 134 is presently disposed. When vehicle 134 is disposed within geographic region 356, for example, the user can only be interested in the channels used locally within geographic region 356, even though channels used by surrounding regions 350, 358 and 366 can be available to be monitored in at least a portion of region 356. Using the methods of certain embodiments of the present invention, only those channel systems specifically associated with the geographic region within which the scanner 136 is disposed will generally be unlocked, thereby automatically culling out the large number of systems associated with other regions.

In certain embodiments, a user in region 356 can be interested in the channels used within region 356 along with channels used within region 358, which vehicle 134 is traveling toward. This can be particularly true as vehicle 134 approaches the boundary between region 356 and region 358. It is possible, for example, that there is some emergency immediately on the other side of the boundary between region 356 and region 358. If a system associated with region 358 is ignored until vehicle 134 is physically located within region 358, the driver of vehicle 134 can have inadequate warning of a hazardous or otherwise undesirable situation. Monitoring systems in both regions can serve to alert the user as to conditions, such as weather or traffic conditions, which vehicle 134 can encounter in the near term in region 356 as well as conditions which can be encountered further on in region 358.

In some embodiments, the scanner 136 scans only systems associated with the geographic region in which the scanner 136 detects that it is presently disposed. In such an embodiment, the scanner 136 will transition through the systems associated with regions 356, 358, 362 and 354 as vehicle 134 travels through those regions. As the vehicle 134 passes from one region to another, the systems associated with the region being left are locked, and systems associated with the region being entered are simultaneously unlocked.

In some embodiments, there can be a "buffer zone" (not shown) disposed on either side of the boundaries separating the regions. Whenever the scanner 136 is disposed within a buffer zone, the systems associated with the regions on either side of the boundary will be unlocked. In certain situations, a scanner 136 located in close proximity to an intersection of two or more boundaries can include the systems associated with four or more different regions at the same time.

In some embodiments, there can be a hysteresis built in to the system, such that systems unlocked upon entry to one region are not automatically locked immediately upon exit from that region, but are only locked after passage of a predetermined time or a distance from the region boundary. In some embodiments, there can be a "reverse hysteresis" designed in to the system, such that systems are unlocked as scanner 136 approaches a new region while systems are locked as, or even before, the current region is exited.

The foregoing description has been presented for purposes of illustration and description, and is not intended to be exhaustive or limited to the invention in the form disclosed. Many modifications and variations will be apparent to those of ordinary skill in the art.

I claim:

1. A system comprising:
   a memory for storing identification data and associated location data for sources of wireless signals; and
   a receiver for receiving a wireless signal from a first source of wireless signals;
   a processor configured for determining a geographic region in which the receiver is located based solely on identification information in the wireless signal from the first source of wireless signals, the determining of the geographic region including:
      detecting the identification information in the received wireless signal,
      searching the memory for identification data that matches the identification information, and
      retrieving location data associated with the matching identification information, thereby determining the geographic region in which the receiver is located,
   wherein the processor is further configured for:
      searching the memory for additional sources of wireless signals that are in the thus determined geographic region, and
      enabling only data associated with sources of wireless signals that are located within the determined geographic region, thereby providing for enabled sources of wireless signals, the enabled sources of wireless signals including only the first and the additional sources of wireless signals.

2. The system of claim 1, further comprising a tuner for tuning the receiver, wherein the processor is adapted to control the tuner in a scanning mode to only tune the receiver to frequencies associated with the sources of wireless signals in the memory that are enabled.

3. The system of claim 2, further comprising user controls for activating and deactivating the scanning mode.

4. The system of claim 2, further comprising user controls for designating as enabled or disabled the data associated with any of the sources of wireless signals in the memory.

5. The system of claim 1, wherein the sources of wireless signals designated as enabled include sources associated with at least one of an EDACS radio system, an LTR radio system, a Motorola Trunking system, and a radio system utilizing an APCO P25 trunking protocol.

6. The system of claim 1, wherein the identification information in the received wireless signal comprises an identifying signal transmitted on a trunking radio system control channel.

7. The system of claim 1, further comprising a display for displaying at least one of the identification data, the identification information, and the determined geographic location.

8. A method comprising:
receiving, by a receiver, a wireless signal from a first source of wireless signals;
determining a geographic region in which the receiver is located based solely on identification information in the wireless signal from the first source of wireless signals, the determining of the geographic region including:
detecting the identification information in the received wireless signal;
searching a memory that contains identification data and associated location data for identification data that matches the identification information; and
retrieving location data associated with the matching identification information, thereby determining the geographic region in which the receiver is located;
searching the memory for additional sources of wireless signals that are in the thus determined geographic region; and
enabling only data associated with sources of wireless signals that are located within the determined geographic region, thereby providing for enabled sources of wireless signals, the enabled sources of wireless signals including only the first and the additional sources of wireless signals.

9. The method of claim 8, further comprising tuning a receiver in a scanning mode to only frequencies associated with the sources of wireless signals in the memory that are enabled.

10. The method of claim 9, further comprising activating the scanning mode based on user input and deactivating the scanning mode based on user input.

11. The method of claim 8, wherein the sources of wireless signals designated as enabled include sources associated with at least one of an EDACS radio system, an LTR radio system, a Motorola Trunking system, and a radio system utilizing an APCO P25 trunking protocol.

12. The method of claim 8, wherein the identification information in the received wireless signal comprises an identifying signal transmitted on a trunking radio system control channel.

13. A method comprising:
tuning a radio receiver until a signal is received that includes an identifier;
retrieving from a database a location associated with the identifier; and
determining a general geographic region in which the receiver is located based exclusively on the location retrieved from the database; and
designating as enabled only data in the database that is associated with sources of wireless signals that are located within the thus determined geographic region, wherein data associated with other sources of wireless signals is designated as disabled.

14. The method of claim 13, further comprising populating a memory with data associated with sources of wireless signals that are located within the determined geographic region.

15. The method of claim 13, further comprising designating as enabled only data in a second database that is associated with sources of wireless signals that are located within the determined geographic region, wherein data associated with other sources of wireless signals is designated as disabled.

* * * * *